United States Patent [19]

Brewer et al.

[11] 4,269,643

[45] May 26, 1981

[54] RETREADING STACKED TIRES USING INFLATABLE PRESSURE MEMBER

[75] Inventors: Donaldee Brewer; Michael J. Dundon, both of Muscatine, Iowa

[73] Assignee: Bandag Incorporated, Muscatine, Iowa

[21] Appl. No.: 7,564

[22] Filed: Jan. 29, 1979

[51] Int. Cl.³ .......................................... B29H 17/36
[52] U.S. Cl. .................................... 156/96; 156/112; 156/286; 156/382; 156/394 FM; 100/211; 100/267; 100/269 A; 425/18
[58] Field of Search ................... 156/96, 112, 126–129, 156/394, 285, 286, 382; 425/14, 17, 18, 22; 100/211, 230, 265, 267, 269, 269 A

[56] References Cited

U.S. PATENT DOCUMENTS

| | | | |
|---|---|---|---|
| 2,014,010 | 9/1935 | Wheatley | 425/18 |
| 2,448,314 | 8/1948 | Kavanagh | 100/269 A |
| 3,190,215 | 6/1965 | Howard et al. | 100/269 A |
| 3,742,537 | 7/1973 | Merrill | 100/269 A |
| 3,884,739 | 5/1975 | Hindin et al. | 156/96 |
| 3,886,028 | 5/1975 | Hindin et al. | 156/394 |
| 3,917,440 | 11/1975 | Huebert | 425/18 |
| 4,115,171 | 9/1978 | Dundon | 156/96 |

FOREIGN PATENT DOCUMENTS

1152141  5/1969  United Kingdom ................ 100/269 A

*Primary Examiner*—John E. Kittle
*Attorney, Agent, or Firm*—Cushman, Darby & Cushman

[57] ABSTRACT

An improved method and apparatus is shown for simultaneously retreading all of the tires in a stack of rubber tires that have been placed in an autoclave or the like. Each of the tires is covered respectively with a precured tread and enclosing envelope having a U-shaped cross section that surrounds the periphery of the tire to be retreaded, the inner edges of the respective envelopes being pressed to seal against the rims or shoulders of the tires. Proper sealing of the edges of the U-shaped envelopes against the sides of the tires is effected by compressing the stack against a back-up means adjustably supported on and locked in position on a post that extends centrally through the stack. The improved means for producing compression in the tire stack includes an inflatable tire means that surrounds the post to press the stack against the back-up means. The apparatus here shown is particularly adapted to a procedure for first pressurizing the stack and pulling a vacuum on the space inside each envelope prior to placing the stack in the autoclave and then placing the stack in the autoclave and inflating the pressure tire to maintain the seal between the tires and the envelopes. The curing process is then completed in the autoclave for applying the precured tread strips to the tires to effect the recapping of the tires.

21 Claims, 3 Drawing Figures

RETREADING STACKED TIRES USING INFLATABLE PRESSURE MEMBER

BACKGROUND

It is well known to bond a precured rubber tread strip to a tire periphery with a rubber based bonding medium which vulcanizes when heat and pressure are applied to the assembly of tire and tread strip. It is also known, as disclosed in U.S. Pat. No. 3,884,739, to retread a plurality of enveloped tires by stacking them vertically on a base with plate elements disposed between the individual tires, placing the assembly of stacked tires in an autoclave and effecting seals between the precured tread within the envelopes and their respective tires by inflating the tires themselves so as to compress the stack between the base and a fixed element in the autoclave. A stack of such tires with alternate planar support means disposed between each of the tires in the stack placed in the autoclave, are shown in my copending application Ser. No. 724,766 filed Sept. 20, 1976 for Retreading Stacked Tires.

SUMMARY OF THE INVENTION

The present disclosure includes an improved procedure and apparatus for accomplishing the retreading of stacked tires as taught in my above-mentioned copending application. In accordance with this invention, the tires to be retreaded are stacked on a horizontally disposed platform that is mounted for vertical movement along a post that extends vertically upwardly from the table surface of a wheeled carrier. An inflatable and expansible tire-like element is disposed between the upper surface of the table and the underside of the tire supporting platform. When a stack of tires to be retreaded has been placed over the post to rest upon the platform and a top backup plate has been fixed to the upper end of the post, the inflatable tire element is pressurized to expand it to lift the platform and compress the stacked tires held between the platform and the back-up plate.

The inflatable tire element may be used to preload the tire stack to produce a sealing force on the stacked tires to test the effectiveness of the seals between the edges of the U-shaped envelopes and the tires prior to the loading of the carrier into the autoclave. After the tire stack has been laid up and the inflatable tire has been filled, a vacuumizing means is connected through each of the envelopes to remove any gas bubbles from the space between the envelopes and the periphery of the tires and if all the seals remain intact, the carrier then may be moved from the loading station to the atuoclave area. When the loaded carrier has been tested and then placed in the autoclave, an inflation line is again connected to the inflatable tire and an exhaust line is connected to each of the vacuumizing means on each of the envelopes. The autoclave may then be heated and pressurized while the vacuum is applied to the envelopes and the inflatable tire is activated while the curing of the treads on the stacked tires is completed. It is preferred that a pressure differential be maintained between the autoclave pressure and the inflation pressure maintained in the pressurized tire such that the inflated tire pressure is always greater than the autoclave pressure.

DETAILED DESCRIPTION

The invention will be further understood from the following detailed description of an exemplary embodiment taken with the drawings in which.

Figure 1:
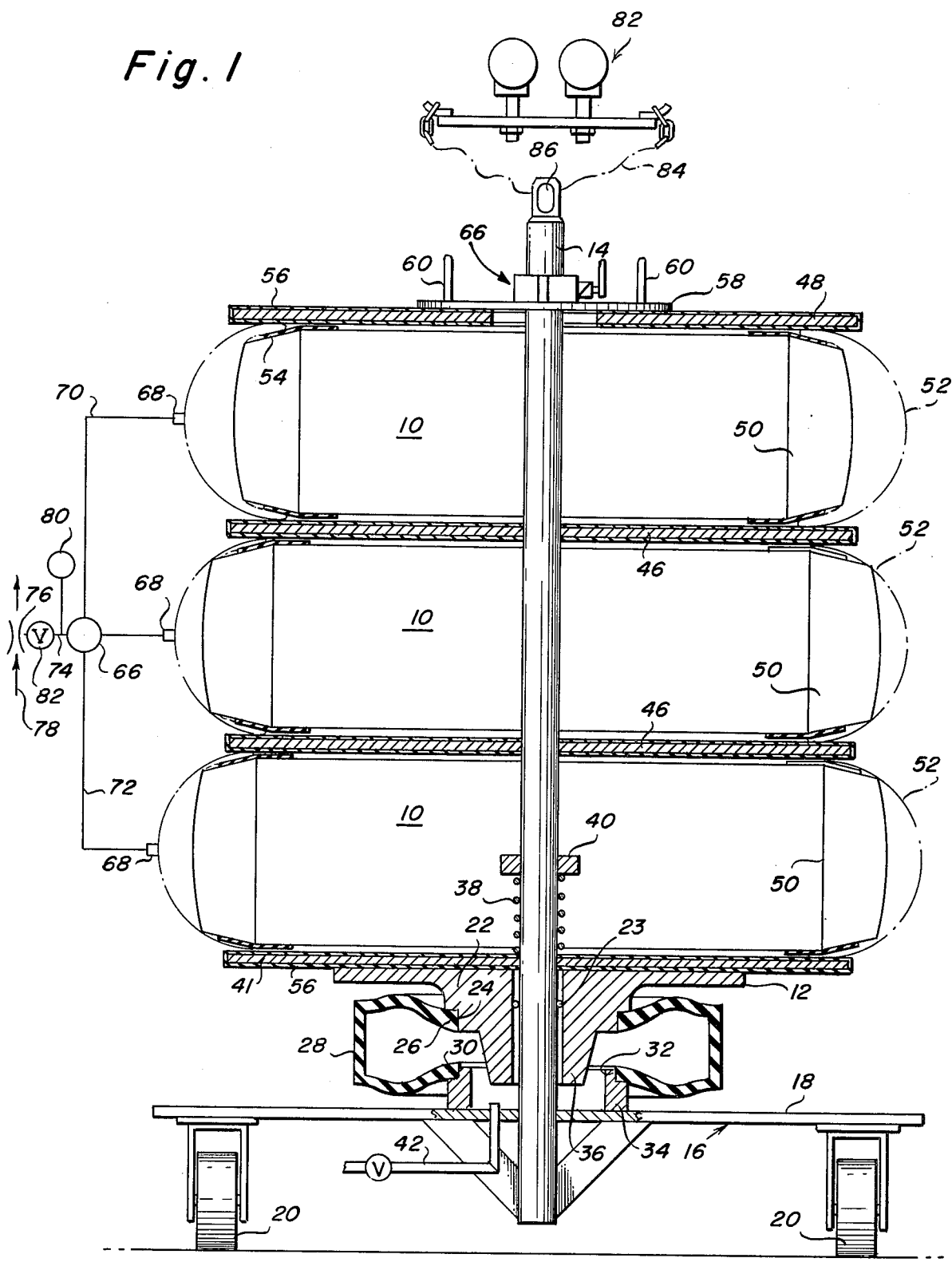
FIG. 1 is a front elevation of the tire stacking apparatus, with the tires illustrated schematically.

To accomplish the retreading operation, this apparatus is designed to receive a stack of tires 10 on a platform 12 that is adapted to be moved vertically with respect to the post 14. The stack surrounds the generally vertically disposed post 14 that is fixed at its bottom end integrally with a wheeled support means 16. The support means is fitted with a table 18 having wheels 20 on its underside to make the stack carrying apparatus portable.

The platform 12, upon which the tires are stacked, is slidably mounted on post 14 and the platform carries a spacer collar and tire mounting flange 22 on its underside. The flange has a centrally disposed aperture that surrounds the post and a sliding seal means 23 is positioned between the wall of the aperture and the post, for a purpose that will appear more fully below. The spacer collar 22 has a shoulder 24 formed thereon for receiving one bead 26 of an expansible and inflatable tire 28. The other bead 30 of the tire is engaged in a shoulder 32 formed in a ring 34 fixedly carried on the upper surface of support means 16. The flange 22 has an integral spacer ring portion 36 protruding downwardly therefrom that extends beyond shoulder 24 to engage against the support 16 when the tire 28 is deflated so that platform 12 may be held solidly supported on the apparatus while a stack of tires is being built up on the support. It will be noted that the space confined within the inflatable tire and ring 34 and between table 18, post 14, seal 23 and flange 22 forms an airtight but expansible space that is adapted to be filled with compressed air to expand the tire when it is inflated with compressed air supplied through line 42.

A compression spring 38 is trapped between a collar 40 pinned to the relatively stationary post 14 and the upper surface of plate 41 that is carried on platform 12 to urge the flange 22 and its integral spacer 36 toward engagement with the upper surface of table 18. When the tire 28 is deflated, the spring 38 holds platform 12 in its lowermost position as determined by spacer 36 and when the tire is inflated by feeding a compressed gas into the tire through line 42, the tire expands and lifts the platform upwardly along post 14 against the compression of spring 38.

The tires to be recapped are stacked one on top of the other around post 14 to be carried on the platform 12. The stack is built up as described in my copending applicaton while tire 28 is deflated, there being an annular divider plate 46 disposed between each of the tires and similar annular plates 48 and 41 at the top and bottom of the stack respectively. Each tire has previously been prepared for retreading in the usual way and has a precured tread 50 placed thereon to surround its buffed periphery, with a layer of vulcanizable bonding composition (not shown) interposed between the tread and the tire periphery. In the form illustrated, each tire 10 is a solid rubber tire which, after being buffed, has a periphery in the form of a solid cylindrical band of rubber. Before being placed in the stack, each tire and tread assembly is fitted with an annular flexible rubber envelope 52 that has a U-shaped cross section, all of which tire preparation and stack building procedures are known in the retreading art.

Figure 2:
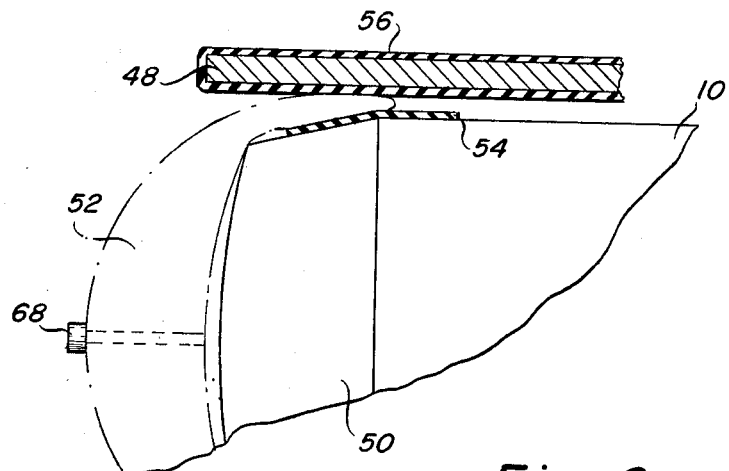
FIG. 2 is an enlarged sectional view showing one shoulder of a stacked tire, an envelope, a tire flap and plate assembly.
Figure 3:
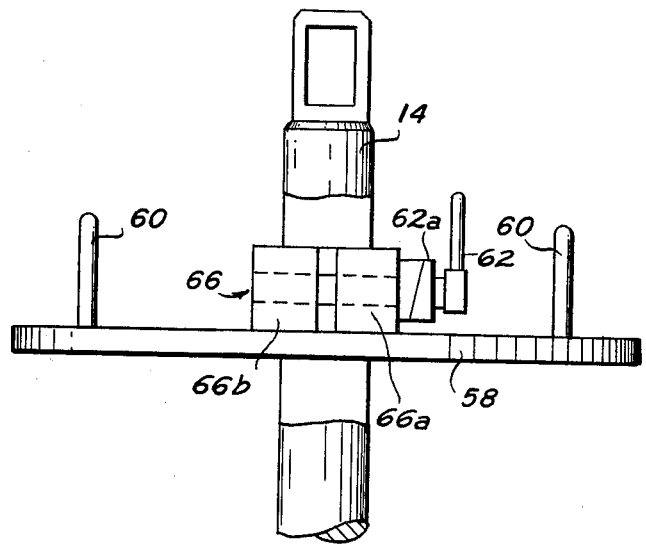
FIG. 3 is a cut-away of the split collar means at the upper end of the post for locking the back-up plate on the post on top of the assembled tire stack.

After each tire and tread assembly has been made, an annular sheet of heavy rubber such as a truck tire flap 54, as best shown in FIG. 2, is tucked around each shoulder of the tire to lie between the shoulder and each of the edges of the envelope 52 that are pressed against the shoulders of tire 10 by the annular plates when tire 28 is inflated. These annular flaps 54 should be no larger than the final outside diameter of the assembled tread 50 and tire being retreaded and no smaller than about one inch less than the outside diameter of the ground tire carcass 10 to which the tread is being vulcanized. The presence of the flaps 54 during the compression steps applied to the stack of tires during the preliminary testing and the final curing operation provides cut protection for the envelope 52 and compression rubber to seal any indentations in the side edges of the periphery of tire 10.

Stacking of the enveloped tires on plate 41, that is carried on platform 12, is performed by placing the enveloped tires alternately in the stack with the intermediate plates 46 therebetween and then placing the top plate 48 on the uppermost tire. The plates 46 and 41 as well as plate 48 may all be identical, and each is provided with a soft flexible cover 56.

After plate 48 has been mounted on the top of the stack of tires (three such tires are here shown for illustrative purposes), a back-up ring 58 having handles 60 is slid onto the upper end of post 14 and moved down into tight engagement over top plate 48. In order to hold the assembly in place a split clamping block 66 is moved down over the end of the post 14 and is then clamped to the post. The clamping block has a central hole for receiving the post and a single slot 64 extending from the hole through the body of the block 66 thereby forming two arms 66a and 66b. Tightening of the block 66 to the post 14 is achieved by rotating a handle 62 part of a revolution thereby bringing a cam 62a to bear on the arm 66a and forcing it toward the arm 66b. The block then holds the top plate 48 in a fixed position in engagement with the upper side of the top tire 10 in the stack when tire 28 is inflated.

After the desired number of tires have been stacked in this manner on platform 12 and bottom plate 41 and the backup plate 58 has been secured to post 14, a preload sealing force may be applied to the stacked tires to be retreaded, by inflating tire 28. As the tire is inflated, the expansion of its beads against shoulders 24 and 32 causes the tires in the stack to be compressed as bottom plate 41 is raised toward the stationary top plate 48. When the tire 28 has been fully inflated, a vacuum can be drawn in the air space between each envelope 52 and its respective tire 10 to remove any air trapped in the space within the sealed envelope.

For this purpose each envelope includes a valve stem 68 or similar device through which a vacuum may be drawn. As shown, a flexible line 70 leads from each valve stem 68 to a manifold 72 and a line 74 leads from the manifold to a suction device 76. The suction device shown includes a venturi nozzle that receives a stream of compressed air from line 78, the line 74 being connected to the low pressure area of the venturi. The line 74 is connected with a vacuum gauge 80 to indicate the degree of vacuum imposed on each air space within the respective sealed envelopes 50 and a manual valve 82 may be provided in line 74 between the venturi and the gauge to seal off the vacuumized spaces when the desired degree of vacuum has been reached. If the reduced pressure in the vacuumized envelope system remains constant after the valve 82 has been closed, or perhaps raises only very slowly, the stack of tires has been properly prepared within the sealed envelopes 52 and the stack of tires is ready to be placed in the autoclave (not shown).

The stacked tires on support 16 may be moved to the autoclave to be suspended therein from a movable carriage assembly 82 to be moved through the autoclave in a known manner. The stacked tire assembly may be hung from the carriage on a chain 84 supported from the carriage and passing through an eye 86 integral with the upper end of post 14.

When the stacked tires are in the autoclave, a vacuum is pulled on each tire envelope 52 and inflation line 42 is connected to tire 28 so that a desired pressure can be maintained in the inflatable tire and the desired vacuum maintained in the space between the tire and its respective envelope while the stacked assembly is in the autoclave. The autoclave is then pressurized and heated in the usual manner to create the necessary bonding conditions. It is desired that a pressure differential be maintained between the autoclave pressure and the pressure in tire 28 while the stack is being compressed and during the curing cycle. The pressure in the tire should always be maintained higher than the autoclave pressure to insure the integrity of the seals between the edges of the envelopes and the shoulders of the tires.

Tires of various kinds, such as press-on, filled, pneumatic, and solid molded and various sizes of such tires may be assembled together in a single stack on the apparatus here shown, to be retreaded. The envelopes 52 press the precured threads 50 against the periphery of the tires being retreaded and the usual autoclave operation can be performed thereon as described above.

The structure shown can be modified to mount the inflatable and expandable tire 28 at the upper end of post 14 between the back-up ring 58 and top plate 48. In this instance, the stack of tires would be supported on the soft covering of bottom plate 41 that in turn would then be carried directly on the upper surface of table 18. To use the inflatable tire at the upper end of post 14, the tire mounting rim 34 would be mounted on the underside of ring 58 and flange 12 would be sealed onto the top side of a plate 48. The locking ring 58, as well as flange 12 would have to be sealed in an airtight manner against post 14 so that tire 28 could be inflated, otherwise the apparatus would remain unchanged, and could be made to operate in the same manner as the preferred structure described above.

After the vulcanizing operation has been completed in the autoclave, the apparatus with the stacked tires thereon is removed from the autoclave and the tires are allowed to cool. The vacuumized envelopes may then be opened to the atmosphere and the tire 28 is deflated whereupon locking ring 58 can be removed from post 14 and then the enveloped retreaded tires may be unstacked so the envelopes 52 can be removed therefrom.

This apparatus provides an improvement on the tire stacking means shown in my copending application. It makes it possible to simplify the stacking and unloading operations, requiring less manual labor and eliminates structural elements while accomplishing all of the desired functions inherent in my prior invention.

What is claimed is:

1. A method of preparing tires for retreading by applying to the periphery of each tire a precured tread strip with a vulcanizable bonding medium disposed between the tire periphery and the tread strip; applying an annular U-shaped envelope to the periphery of each tire so that the edge portions of the envelope overlie the rim or shoulder portion of the tire; stacking the tires vertically on a support with a plate disposed between each two adjacent tires, the plates engaging the edge portion of the envelopes; placing a top plate on the upper surface of the uppermost tire, the improvement comprising: providing a connection between the top plate and the support which restrains upward movement of the top plate connecting a pneumatically powered device between the support and the top plate and supplying pneumatic pressure thereto to compress the stack thereby sealing each tire to the edge portions of its respective envelope; while the stack is compressed, exhausting air from the space between each tire and the inner surface of its respective envelope; and placing the assembly of stacked tires and plates in an autoclave and supplying heat to the autoclave while maintaining pressure in the pneumatically powered tension means.

2. A method as in claim 1 wherein the pneumatically powered compressing device is always supplied with compressed air at a pressure greater than the pressure produced in the autoclave.

3. A method as in claim 1 wherein before moving the stack of tires into an autoclave, a preload sealing force is applied to the stacked tires by pressurizing said pneumatically powered compressing device and said suction is applied to the space within each envelope surrounding a tire in the stack to test the seal between the edge portions of the envelopes and their respective tires, and then placing the stacked assembly in the autoclave when all of the seals have been made.

4. A method as in claim 3 wherein after successfully performing said test, the preload force is released by exhausting the pneumatic pressure supplied to said compressing device and releasing the suction applied to said space and then moving the stacked tires into said autoclave wherein said suction is again applied to said space and said pneumatically powered means is again pressurized.

5. A method as in claim 4 wherein the pneumatic pressure in said powered compressing device is always greater than the pressure produced in the autoclave.

6. Apparatus for preparing a plurality of stacked tires for retreading and insertable with its stacked tires in an autoclave, there being a mobile support having an upper surface over which a vertical stack of tires is supported, each of said tires having a precured tread strip applied to its periphery with a layer of vulcanizable bonding material therebetween and each tire assembly being provided with a U-shaped envelope covering the tread strip and having edge portions overlying the rims or shoulders of the tire; a horizontal plate disposed between each tire and the neighboring tires and a top plate overlying the uppermost tire, the edge portions of each envelope being thereby pressed against the rim or shoulder portions of the respective tire; and means for exhausting air from the space between each envelope and its respective tire and tread, the improvement comprising: a post fixed to said support and extending generally vertically upwardly from said upper surface of the mobile support, a tire stack supporting platform movably mounted on said post and spaced above said upper surface, an expandable inflatable means positioned between said upper surface and said top plate, means for releasably holding said top plate fixed relative to said post, and means to inflate said expandable means to compress said stack of tires to effect a seal between the edge portions of each envelope and the rim or shoulder portions of each of the respective tires.

7. An apparatus as in claim 6 wherein said upper surface on the mobile support has a rim integral with its upper face, said rim being sealed airtight against said surface and being adapted to support one bead of an inflatable tire, said rim being disposed on said surface to be concentric with said post, a second bead-receiving rim integral with the underside of said platform and concentric with said post, means to seal said second rim airtight with respect to said post, said expandable inflatable means being an expansible tire mounted on said rims.

8. An apparatus as described in claim 6 wherein a compression spring is carried on said post to resiliently urge said platform toward said upper surface.

9. An apparatus as in claim 7 wherein said platform has an integral circular shoulder on its underside, said shoulder being concentrically disposed to extend downwardly into the space enclosed within said rim that is integral with said platform, said shoulder extending to the surface of said platform to form a stop engaging against said upper surface to limit the movement of said platform toward said upper surface when said expandable means is deflated.

10. An apparatus as in claim 6 wherein said means for holding said top plate relative to said post is manually operable between its engaged and released positions.

11. An apparatus as in claim 10 wherein said means for pressing includes an element that is manually rotated for a part of a revolution around said post to engage on thread elements to engage said top plate against the uppermost tire in said stack.

12. Apparatus for supporting a plurality of stacked tires for retreading and insertable with its stacked tires in an autoclave, said apparatus comprising: a horizontal support having an upwardly facing surface; a rigid vertical post fixed to said support and extending upwardly therefrom to receive a plurality of stacked tires placed over said post; a horizontal plate slidable vertically on said post; means cooperating with said plate and with said post for releasably limiting upward movement of said plate relative to said post; an inflatable vertically expandable and contractible device disposed between said upwardly facing surface of said support and said plate for selectively compressing a stack of tires placed over said post and below said plate.

13. Apparatus as in claim 12 wherein said inflatable device includes: a tire disposed coaxially with said post, said tire having upper and lower beads, a lower ring disposed between said tire and said support and sealably engaging said lower bead, an upper ring slidably mounted on said post and sealably engaging said upper bead, means for supplying fluid pressure to said tire to inflate the same whereupon said upper ring moves upwardly relative to said post, and sealing means between said upper ring and said post for preventing loss of fluid pressure.

14. Apparatus as in claim 13 including a coil compression spring coaxially surrounding said post and biasing said upper ring downwardly.

15. Apparatus for preparing a plurality of stacked tires for retreading when each such tire has a tread strip applied to its periphery and has a U-shaped envelope covering the tread strip with edge portions overlying the shoulders of the tire, said apparatus being insertable with its stacked tires in an autoclave, said apparatus comprising: support means having an upper surface; a post extending upwardly from said support means; platform means vertically slidable on said post and having an upper surface for receiving the lowermost of a stack of tires placed over said post; resilient bias means cooperating with said platform means to urge the latter downwardly toward said support means; inflatable means disposed between said support means and said platform means and engageable therewith upon inflation to move said platform means upwardly against the downward force of said bias means; upper plate means for resting on top of the uppermost of a stack of tires placed over said post; and clamping means slidable on said post at a location above said upper plate means and clampable to said post at desired positions to thereby serve as a stop which retards upward movement of said upper plate means.

16. Apparatus as in claim 15 wherein said bias means includes a coil compression spring surrounding said post and a stop member fixed to said post and engaging the upper end of said spring, the lower end of said spring engaging said platform means.

17. Apparatus as in claim 15 wherein said inflatable means includes a tire concentric with said post, said platform means including a downwardly projecting rim engaging the upper bead of said tire and said support means including an upwardly projecting rim engaging the lower bead of said tire.

18. Apparatus as in claim 17 including fluid pressure connection means for supplying fluid pressure to a space between said rims so as to inflate said tire; and a seal between said platform means and said post.

19. Apparatus for preparing a plurality of stacked tires for retreading when each such tire has a tread strip applied to its periphery and has a U-shaped envelope covering the tread strip with edge portions overlying the shoulders of the tire, said apparatus being insertable with its stacked tires in an autoclave, said apparatus comprising: support means having an upper surface; a post extending upwardly from said support means; platform means vertically slidable on said post and having an upper surface for receiving the lowermost of a stack of tires placed over said post; an inflatable tire, concentric with said post, disposed between said support means and said platform means and engageable therewith upon inflation to move said platform means upwardly; upper plate means for resting on top of the uppermost of a stack of tires placed over said post; vertically adjustable stop means for said upper plate means carried by said post above said upper plate means.

20. Apparatus as in claim 19 wherein said platform means includes a downwardly projecting rim engaging the upper bead of said tire and wherein said support means includes an upwardly projecting rim engaging the lower bead of said tire.

21. Apparatus as in claim 20 including fluid pressure connection means for supplying fluid pressure to a space between said rims so as to inflate said tire; and a seal between said platform means and said post.

* * * * *